United States Patent Office 3,404,126
Patented Oct. 1, 1968

3,404,126
PROCESS OF PREPARING COLOR IMPROVED GLYCIDYL POLYETHERS OF POLYHYDRIC PHENOLS
Robert W. Welch and Dale M. Magre, Louisville, Ky., assignors to Celanese Coatings Company, New York, N.Y., a corporation of Delaware
No Drawing. Filed Dec. 29, 1966, Ser. No. 605,593
6 Claims. (Cl. 260—47)

ABSTRACT OF THE DISCLOSURE

A process for preparing light colored glycidyl polyethers of polyhydric phenols by reacting a solution of the polyhydric phenol in epichlorohydrin with zinc and hydrochloric acid prior to dehydrohalogenation with sodium hydroxide.

BACKGROUND OF THE INVENTION

The field of art to which this invention pertains is heterocyclic carbon compounds and particularly epoxy compounds prepared by dehydrohalogenation.

The preparation of glycidyl polyethers of polyhydric phenols by the reaction of epihalohydrins with polyhydric phenols using caustic as the condensing and dehydrohalogenating agent is well known as evidenced by the following patents: U.S. 2,716,099 and U.S. 2,801,277. However, most commercially produced glycidyl polyethers are amber to reddish brown in color, such colors being generally above 3 on the Gardner color scale. Although these materials have found wide usage in a variety of applications, their color presents problems when they are used in transparent castings, optical objects and the like. Light colored glycidyl polyethers can be prepared by using ultra-pure reactants, or by purifying the resins themselves by distillation, extraction or crystallization. However, these processing steps result in lower yields of resins and resins of higher cost.

SUMMARY OF THE INVENTION

By this invention, light colored glycidyl polyethers of polyhydric phenols are prepared by adding the step of reacting the solution of epihalohydrin and polyhydric phenol with zinc metal and hydrochloric acid prior to the reaction with caustic. After dehydrohalogenation, the recovered resinous product is much lighter in color than those obtained by the same process without the initial zinc-acid step. Standard raw materials can be used in this process and it is not necessary to purify the products.

DESCRIPTION OF THE INVENTION

In conducting the process of this invention, the polyhydric phenol is dissolved in an epihalohydrin in excess of that equivalent to the phenolic hydroxyl groups of the polyhydric phenol. Zinc metal in an amount of about 0.1 to about 5.0 weight percent based on the weight of the polyhydric phenol and hydrochloric acid substantially equivalent to the zinc is added. The solution is agitated for a time sufficient to render the solution substantially colorless, generally for a period of about 15 minutes to about 1 hour. The temperature of the solution can be held at about 20° C. to 30° C. (68° F. to 86° F), but this initial reaction can be conducted at higher temperatures up to about 100° C. (212° F.), if desired. When the color reduction is completed, the solution is reacted with caustic using standard condensation and dehydrohalogenation conditions. A preferred method is to add the zinc metal and hydrochloric acid to the solution of polyhydric phenol and epichlorohydrin at room temperature and to slowly heat the reactants to 60° C. to 70° C. and then begin the addition of caustic for the dehydrohalogenation reaction.

The polyhydric phenols used in the process of this invention are those compounds which contain more than one phenolic hydroxyl group and no other group reactive with epoxy groups. Examples of such polyhydric phenols are resorcinol, hydroquinone, p,p'-dihydroxydiphenyl, dihydroxybenzophenone, dihydroxydiphenyl sulfone, dihydroxynaphthalene, and novolak resins which are the non-heat reactive reaction products of substituted phenols with aldehydes, such as phenol plus formaldehyde. The preferred polyhydric phenols are dihydric phenols and most preferably p,p'-dihydroxydiphenyl propane, commonly called Bisphenol A.

In carrying out the process of this invention, an excess of epichlorohydrin over that equivalent to the phenolic hydroxyls is used. On a molar basis, it is preferred to use at least about 5 mols up to about 20 mols of epichlorohydrin for each mol of polyhydric phenol, and most preferably, about 10 mols for each mol of polyhydric phenol.

The zinc metal which is added to the solution of polyhydric phenol in epichlorohydrin can be in any physical form However, in order for the color reduction to take place in a reasonable length of time, it is preferred that the zinc be in finely divided form, either as zinc turnings or zinc powder. It has been found that comminuted zinc, commonly referred to as zinc dust, is an advantageous form for use in this invention. The amount of zinc that is used, based on the weight of polyhydric phenol, is from about 0.1 weight percent up to about 5 weight percent. Excellent results are obtained using from about 0.3 to about 1.0 weight percent.

The hydrochloric acid used in this invention is preferably a solution of hydrogen chloride in water, since the acid in this form can be readily metered into the reactor. The concentration of the hydrogen chloride in the water can be varied from about 1 weight percent up to about 35 to 40 weight percent. However, in order not to incorporate an excess of water in the solution of polyhydric phenol and epichlorohydrin, it is preferred to use concentrated hydrochloric acid wherein the concentration of hydrogen chloride is about 30 to 38 weight percent. The amount of hydrochloric acid utilized should be substantially stoichiometrically equivalent to the zinc which is added. If less than the stoichiometric amount of acid is used, full utilization of the zinc is not obtained. If excess hydrochloric acid is used, additional caustic is required in the dehydrohalogenation step to neutralize this excess, thus adding to the raw material costs of the process.

The dehydration reaction is conducted by adding caustic alkali to the solution of epichlorohydrin and polyhydric phenol in an amount substantially equivalent to the phenolic hydroxyl groups of the polyhydric phenol and the hydrochloric acid which is added in the first step of the process. The caustic alkali-sodium hydroxide or potassium hydroxide, can be added incrementally in solid form or as an aqueous solution. The temperature during the dehydrohalogenation is held between about 170° F. and 250° F. using sub- or super-atmospheric pressures where necessary. After all the caustic alkali is added and reacted, the polyepoxide product is recovered by removal of the salt formed in the reaction and the excess unreacted epichlorohydrin. The chlorine content of the product can be reduced by further reaction of the product with caustic alkali. In order to obtain products of the lowest color, it is preferable to carry out the entire reaction in the absence of oxygen under an inert gas atmosphere. The preferred inert gas for economic reasons is nitrogen.

DESCRIPTION OF THE PREFERRED EMBODIMENTS

The invention can be more readily understood by reference to the following examples. Parts and percentages, where used, are by weight.

Example 1

To a suitable reactor equipped with a mechanical agitator thermometer, and condenser were added 686.7 parts of Bisphenol A, 2770.8 parts of epichlorohydrin and 44.5 parts of water. Agitation was begun and nitrogen gas was introduced into the reactor to replace the air. After the Bisphenol A had dissolved, 20 parts of zinc dust and 45 parts of concentrated hydrochloric acid (37 weight percent in water) were added to the reactor. Agitation was continued for 20 minutes after which time the solution was substantially colorless. Heat was then applied raising the temperature to 150° F. Flake sodium hydroxide (23.6 parts) was added. The temperature rose to 170° F. due to the exothermic reaction. Flake sodium hydroxide (224 parts) was added over a period of 90 minutes while keeping the temperature between 170° F. and 178° F. After all the sodium hydroxide had been added, the temperature was held at 170° F. for 10 minutes. Sufficient vacuum was then applied to distill the water in the reactants as a water-epichlorohydrin azeotrope while keeping the temperature between 160° F. and 170° F. After 130 parts of water were distilled off, the vacuum was released and heat was applied to distill off the remaining epichlorohydrin. At a pot temperature of 300° F., vacuum (30 mm. Hg pressure) was applied and the temperature was raised to 320° F. and held at this temperature for 10 minutes to ensure removal of all the epichlorohydrin. The reactor contents were then cooled to 250° F. and 897.1 parts of methyl isobutyl ketone were added to dissolve the resinous product. The temperature was allowed to drop to 189° F., at which temperature 1150 parts of water were added to dissolve the salt which had been formed in the reaction. The temperature was held at 180° F. for 15 minutes while slowly stirring the reactor contents. Stirring was discontinued allowing the reactor contents to separarate into two layers. The organic layer was drawn off and the water layer was extracted with two 450 part portions of methyl isobutyl ketone. These extracts were combined with the first organic layer and were placed in a clean reactor. Water, 902.5 parts, was added followed by the addition of 90.8 parts of 50% aqueous sodium hydroxide and 13.1 parts of sodium ortho silicate. The reactor contents were blanketed with nitrogen, were heated with agitation to 160° F. and were held at 160° F. for 10 minutes. The temperature was then raised to 190° F. and was held at 190° F. to 195° F. for 1 hour. Agitation was stopped and the water layer was drawn off. Additional water, 800 parts, was added and the reactor contents were heated to 150° F. with stirring. Sulfuric acid (30% in water) was added to neutralize any unreacted sodium hydroxide. After neutralization was attained, stirring was stopped, the water layer was drawn off, and the reactor contents were heated to 320° F. to distill off the methyl isobutyl ketone. After filtering, 960 parts of resinous product were recovered. This product had an epoxide equivalent weight of 190, a hydrolyzable chlorine content of 0.057, a viscosity at 25° C. of 12,120 cps. and a color of 1 as measured on the Gardner color scale.

An identical reaction carried out without the initial reaction with zinc and hydrochloric acid produced a resin having a color as measured on the Gardner scale of 3–4.

Example 2

To a suitable reactor equipped as described in Example 1 were added 686.7 parts of Bisphenol A, 2770.8 parts of epichlorohydrin and 44.5 parts of water. Stirring was begun and the reactor was flushed with nitrogen. The temperature was raised to 150° F. and zinc dust, 20 parts, and concentrated hydrochloric acid (37% HCl), 45 parts, were added. After 30 minutes at 150° F., the solution was water white. 46.1 parts of 50% aqueous sodium hydroxide were added. The temperature rose to 207° F. due to the exothermic reaction. 435.5 parts of 50% aqueous sodium hydroxide were added over a 90-minute period while keeping the reaction temperature at 205° F. During this addition period, water and epichlorohydrin were continuously distilled as an azeotrope, the water was separated from the distillate and the epichlorohydrin was returned to the reactor. After all the sodium hydroxide had been added, the temperature was held at 205° F. for 10 minutes and was then raised to 320° F. to distill off the unreacted epichlorohydrin. The temperature was dropped to 250° F. and 897.1 parts of methyl isobutyl ketone were added. At 175° F., 1150 parts of water were added. The reactor contents were slowly stirred for 10 minutes; stirring was stopped and the reactor contents separated into 2 layers. The water layer was drawn off and 902.5 parts of water were added to the reactor along with 90.8 parts of 50% aqueous sodium hydroxide and 13.1 parts of sodium ortho silicate. After 10 minutes heating with stirring at 160° F. and one hour at 190° F., 149.6 parts of methyl isobutyl ketone were added. Stirring was stopped and the water layer was drawn off. The organic layer was again extracted with 842 parts of water. After removal of the water layer, the reactor contents were heated to 320° F. to distill off the solvents and the reaction product was filtered. 882 parts of resinous product having an epoxide equivalent weight of 187, a hydrolyzable chlorine content of 0.044%, a Gardner-Holdt viscosity at 25° C. of $Z_5$–$Z_6$ and a color as measured on the Platinum-Cobalt color scale of 90, were recovered.

Example 3

As described in Example 2, 686.7 parts of Bisphenol A were dissolved in 2770.8 parts of epichlorohydrin and 44.5 parts of water. 3.45 parts of zinc dust and 10.4 parts of concentrated hydrochloric acid (37% HCl in water) were added. After 1 hour at room temperature, the solution was water white. The dehydrohalogenation reaction and isolation of product were then carried out using the same procedure and reactants as was described in Example 2. The resinous product, 971 parts, had an epoxide equivalent weight of 182, a hydrolyzable chlorine content of 0.047%, a viscosity at 25° C. of 10,150 cps. and a color as measured on the Platinum-Cobalt color scale of 100.

Example 4

As described in Example 2, 686.7 parts of Bisphenol A were dissolved in 2770.8 parts of epichlorohydrin and 44.5 parts of water. 6.9 parts of zinc dust and 20.8 parts of concentrated hydrochloric acid (37% HCl in water) were added. After 30 minutes at room temperature, the solution was water white. The reaction was then continued using the procedure described in Example 2. The resulting glycidyl ether of Bisphenol A had a viscosity at 25° C. of 10,360 cps. and a color as measured on the Platinum-Cobalt color scale of 130.

Example 5

This example was conducted using the same procedure as described in Example 4 except 0.7 part of zinc dust and 2.1 parts of concentrated hydrochloric acid were added to the solution of 686.7 parts of Bisphenol A dissolved in 2770.8 parts of epichlorohydrin and 44.5 parts of water. The glycidyl ether product had a viscosity of 11,220 cps. at 25° C. and a color as measured on the Platinum-Cobalt color scale of 120.

The Gardner color scale referred to in the examples is described in ASTM, D1544–63T. The Platinum-Cobalt color scale is described in ASTM, D1209–62. A Gardner color scale reading of 1 is comparable to a Platinum-Cobalt color scale reading of 250.

It is to be understood that the foregoing detailed description is given merely by way of illustration and that many variations may be made therein without departing from the spirit of the invention.

The embodiments of the invention in which an exclusive property or privilege is claimed are defined as follows:

1. In a process for preparing glycidyl polyethers of polyhydric phenols by the steps of
    (a) dissolving a polyhydric phenol in epichlorohydrin wherein the epichlorohydrin is in excess of that required for reaction with the phenolic hydroxyls of the polyhydric phenol,
    (b) adding caustic alkali in an amount substantially equivalent to said phenolic hydroxyls to effect condensation of the epichlorohydrin with the phenolic hydroxyl groups to form glycidyl ether groups and
    (c) separation of the formed glycidyl ethers of the polyhydric phenol from the excess epichlorohydrin and the salt and water formed in the reaction, the improvement which comprises
    reacting the solution of epichlorohydrin and polyhydric phenol prior to the addition of the caustic alkali with about 0.1 to about 5 percent by weight of zinc metal, based on the weight of polyhydric phenol, and hydrochloric acid substantially equivalent to the zinc metal at a temperature of about 20° C. to about 100° C for a time sufficient to render the solution substantially colorless.

2. The process of claim 1 wherein the polyhydric phenol is a dihydric phenol.

3. The process of claim 1 wherein the polyhydric phenol is p,p'-dihydroxydiphenyl propane and the caustic alkali is sodium hydroxide.

4. The process of claim 1 wherein the zinc metal is in the form of zinc dust and the hydrochloric acid is concentrated hydrochloric acid having a hydrogen chloride content of about 30 to 38 weight percent.

5. The process of claim 1 wherein the zinc metal and hydrochloric acid are added to the solution of polyhydric phenol and epichlorohydrin at about 20° C. to about 30° C., the temperature is raised to 60° C. to 70° C. and caustic alkali is added.

6. The process of claim 1 wherein the zinc metal and hydrochloric acid are reacted with the solution of polyhydric phenol in epichlorohydrin for a period of about 15 minutes to about 60 minutes prior to the addition of caustic alkali.

References Cited
UNITED STATES PATENTS 2,879,259  3/1959  Tess _____ 260—47

WILLIAM H. SHORT, *Primary Examiner.*

T. D. KERWIN, *Assistant Examiner.*